Oct. 31, 1967 W. HENN 3,350,659

LOGIC GATE OSCILLATOR

Filed May 18, 1966

INVENTOR.
WILLIAM HENN

BY

ATTORNEY

United States Patent Office 3,350,659

Patented Oct. 31, 1967

3,350,659
LOGIC GATE OSCILLATOR

William Henn, Lexington, Mass., assignor to Radio Corporation of America, a corporation of Delaware Filed May 18, 1966, Ser. No. 551,065
3 Claims. (Cl. 331—57)

This invention relates to a new and improved oscillator.

The oscillator of the invention comprises four two-input logic gates, each connected to apply its output to two of the other gates and each gate receiving its two inputs from two other gates.

Figure 1A:
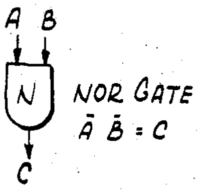
Figure 1B:
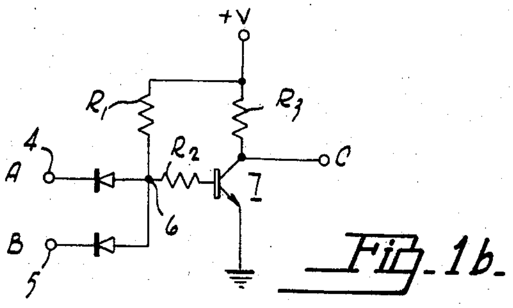
Figure 2A:
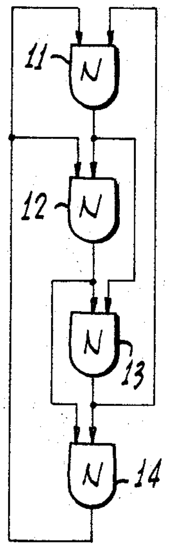
Figure 2B:
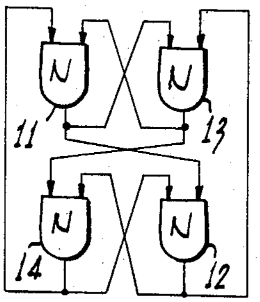
Figure 4:
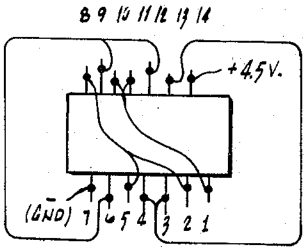
Figure 3:
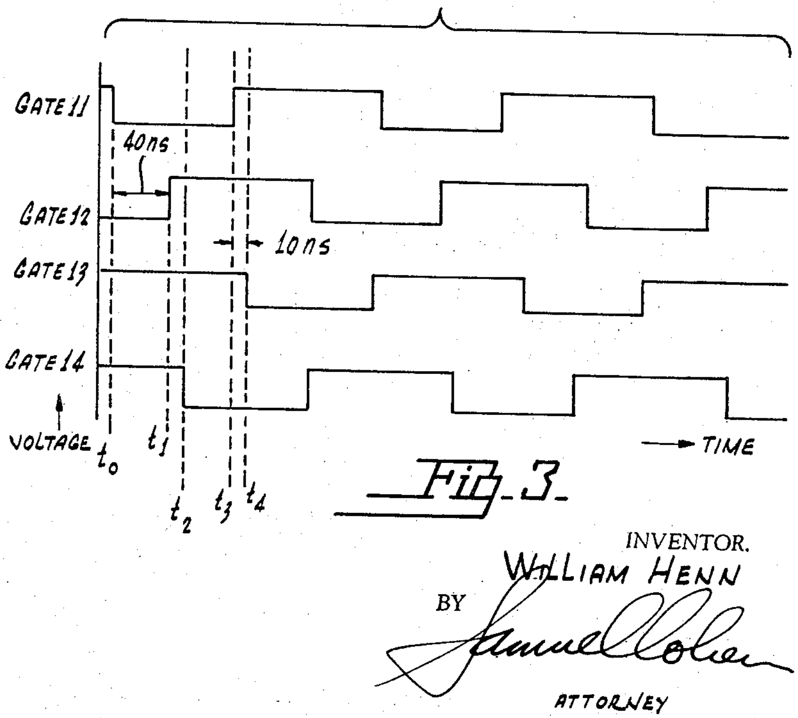

The invention is discussed in greater detail below and is shown in the folowing drawings of which:

FIGURE 1*a* is a block circuit diagram of a NOR gate;

FIGURE 1*b* is a schematic circuit diagram of a typical NOR gate;

FIGURES 2*a* and 2*b* are block diagrams of the oscillator of the invention;

FIGURE 3 is a drawing of waveforms produced in the circuit of FIGURES 2*a* and 2*b*; and FIGURE 4 is a drawing of a "flat-pack" interconnected to oscillate.

FIGURE 1*a* is self-explanatory. The Boolean equation shown describes the operation of the gate. The truth table for the gate is:

| A | B | C |
|---|---|---|
| 0 | 0 | 1 |
| 0 | 1 | 0 |
| 1 | 0 | 0 |
| 1 | 1 | 0 |

For purposes of the present explanation, the convention is adopted that a signal at a relatively low level, such as ground, represents the binary digit 1 and a signal at a relatively high level, such as +V volts, represents the binary digit 0. To simplify the discussion, a signal representing the binary digit 1 or 0 is sometimes referred to hereafter as a 1 or 0, respectively.

In the operation of the circuit of FIGURE 1*b*, if A or B is equal to 1, that is, if input terminal 4 or 5 of the circuit of FIGURE 1*b* is at ground, then the circuit terminal 6 is essentially ground. This means that the emitter and base of transistor 7 are at the same potential, the transistor does not conduct, and its collector is at +V volts. In Boolean terms, $C=0$. On the other hand, if both A and B are 0, that is, if input terminals 4 and 5 are both at +V, the transistor 7 conducts and its collector is essentially at ground potential. In Boolean terms, $C=1$.

FIGURES 2*a* and 2*b* are the same circuit, but shown in different ways. Each circuit consists of four NOR gates 11, 12, 13 and 14, respectively. As is seen most clearly in FIGURE 2*a*, each $i'^{\text{th}}$ gate receives two inputs, one from the $$i \underset{4}{\ominus} i'^{\text{th}}$$

gate and the other from the $$i \underset{4}{\ominus} 2'^{\text{th}}$$

gate, where $i$ is some number from one to four and the $$\underset{4}{\ominus}$$

represents modulo 4 subtraction. In less technical terms, the fourth gate 14, for example, receives an input from the third gate 13 and the second gate 12. As another example, the second gate 12 receives an input from the first gate 11 and from the fourth gate 14, and so on.

In one practical design of the circuit of FIGURE 2, the NOR gates employed are integrated circuits. The circuit parameters are such that each gate requires approximately 10 nanoseconds after both of its inputs become 0 to produce a 1 output and approximately 40 nanoseconds after at least one of its inputs becomes a 1 to produce a 0 ouput. These delays are appropriately legended in FIGURE 3, for gates 13 and 12, repsectively.

The operation of the oscillator is depicted in FIGURE 3. At time $t_0$, the outputs of gates 11 and 12 are both 1 and the outputs of gates 13 and 14 are both 0. Forty nanoseconds later, the output of gate 12 changes to 0 as one of its inputs, namely the input applied by gate 11, is a 1. Ten nanoseconds later, at time $t_2$, the output of gate 14 changes to a 1. This occurs because both of the inputs to gate 14, namely the outputs of gates 12 and 13, are 0.

FIGURE 3 should help the reader to trace the remainder of the circuit operation. Each NOR gate produces a square wave output, as shown, and the circuit output can be taken from any one or more of the NOR gates.

While the circuit of the invention is shown to be implemented with NOR gates, it should be appreciated that other logic gates may be used instead. As one example, if a different convention is adopted for zeros and ones, the gates shown become NAND gates rather than NOR gates.

While the invention is not limited to the circuit shown in FIGURE 1*b*, by way of example, the specific circuit illustrated may employ values of circuit elements as follows:

Diodes—Type 1N914
Resistor $R_1$=6.8K ohms
Resistor $R_2$=3.8K ohms
Resistor $R_3$=5.1K ohms
Transistor 7—Type 2N706
$+V$=6.0 volts.

Conventional integrated circuit "flat-packs," such as Fairchild type 946 flat-packs, contain four gates, each with two inputs. This package can be interconnected to produce oscillations in accordance with the teachings of this invention in the manner shown in FIGURE 4.

An important advantage of the circuit of the present application, aside from its simplicity and relatively low cost, is that it is especially suitable for driving logic circuits implemented with the same types of gates as employed in the oscillator. The reason is that changes in operation of the oscillator due to changes in environmental conditions or common power sources will affect, in a similar manner, the operation of the corresponding logic elements in the circuits being driven. For example, if a logic network is to be used at the maximum repetition rate at which it is capable of operating, as temperature affects the speed of response of the network, any oscillator employed to strobe such a network must either be limited to the slowest speed of operation of which the network is capable or must be compensated to allow for changes in the speed of response of the network. If the oscillator of the present invention is employed in this capacity, since it is directly affected by the same environmental transfer characteristic as the circuit it is driving, it is self-compensated and will match the speed capability of the network it is driving over a relatively large operating range.

The circuit of the present application is also useful for measuring the operating characteristics of commercially available flat-packs. The circuit may be connected so that it oscillates and the oscillating frequency measured. Lack of uniformity of this frequency of oscillation among differnt flat-packs is an indication of varying fabrication parameters and a corresponding non-uniformity of the propagation delays exhibited by the integrated circuits of the flat-packs.

What is claimed is:

1. An oscillator comprising four two-input logic gates, each connected to apply its ouput to two of the other gates and each gate receiving its two inputs from two other gates.

2. A logic circuit as set forth in claim 1, wherein the gates are NOR gates.

3. A logic circuit as set forth in claim 2, wherein said NOR gates include diode means, transistor means and resistor means.

No references cited.

ROY LAKE, *Primary Examiner.*

S. GRIMM, *Assistant Examiner.*